Patented June 12, 1923.

1,458,256

UNITED STATES PATENT OFFICE.

ADRIAAN P. H. TRIVELLI, OF ROCHESTER, NEW YORK, ASSIGNOR TO EASTMAN KODAK COMPANY, OF ROCHESTER, NEW YORK, A CORPORATION OF NEW YORK.

CELLULOSE-ETHER COMPOSITION.

No drawing.      Application filed February 2, 1922. Serial No. 533,659.

*To all whom it may concern:*

Be it known that I, ADRIAAN P. H. TRIVELLI, a subject of the Queen of the Netherlands, residing at Rochester, in the county of Monroe and State of New York, have invented certain new and useful Improvement in Cellulose-Ether Compositions, of which the following is a full, clear, and exact specification.

This application relates to a new composition of matter and particularly to a composition containing cellulose ether, and is a continuation in part of my application Serial No. 327,152, filed Sept. 29, 1919, in so far as it relates to the new compositions of matter therein described.

The composition of matter herein described is particularly useful as a varnish to be applied to motion picture film, as it has the desirable properties of being transparent, flexible, and durable; soluble in certain substances which are not solvents for ordinary photographic emulsions or the usual cellulose esters used for the supports therefor, and is uninflammable in the sense that it is far less combustible than pyroxylin which is customarily used for the support for such photographic film.

I find these and other desirable properties to be present in a composition of matter containing certain cellulose ethers, and more particularly the ethyl ethers of cellulose such as are described in the patent to Lilienfeld, No. 1,188,376, granted June 20, 1916. If a water impervious varnish or composition is desired, those ethyl ethers which are insoluble in water would be used.

As examples of varnishes or compositions of matter useful for the purposes outlined, the following may be mentioned:

| | Parts. |
|---|---|
| Cellulose-ethyl-ether | 4 |
| Butyl alcohol | 20 |
| Benzol | 76 |

Another example is:

| | Parts. |
|---|---|
| Cellulose-ethyl-ether | 3 |
| Amyl alcohol | 15 |
| Toluol | 82 |

A third example is:

| | Parts. |
|---|---|
| Cellulose-ethyl-ether | 5 |
| Amyl alcohol | 5 |
| Butyl alcohol | 15 |
| Xylol | 75 |

The above proportions need not be exactly followed as a considerable degree of variation therefrom is permissible. I contemplate the use of many other substances as equivalents of the constituents specifically mentioned. It is desirable, however, that the varnish or composition should comprise: first, a cellulose ethyl ether; second, a high boiling softener, such as one of the higher alcohols, and especially those that are liquid at ordinary temperature and of relatively low volatility and containing more than two carbon atoms, propyl and iso-propyl alcohol being particularly included, such high boiling softener remaining in the composition even when applied as a varnish coating and evaporating but slowly, thus adding plasticity; and, third, a volatile solvent that will render the varnish or composition fluid during its application but which will evaporate quickly, and, particularly for the uses outlined, a lower member of the benzene series of hydrocarbons by which term I include a member having less than nine carbon atoms.

Having thus described my invention, what I claim as new and desire to secure by Letters Patent is:

1. A composition of matter comprising cellulose ether and a liquid monohydroxy aliphatic alcohol of low volatility and containing more than two carbon atoms.

2. A composition of matter comprising cellulose ether and a monohydroxy aliphatic alcohol containing more than two but less than six carbon atoms.

3. A composition of matter comprising cellulose ether, a monohydroxy aliphatic alcohol containing more than two but less than six carbon atoms and a volatile common solvent.

4. A composition of matter comprising cellulose ether, a monohydroxy aliphatic alcohol containing more than two but less than six carbon atoms and a lower member of the benzene series of hydrocarbons.

5. A composition of matter comprising cellulose ether, a monohydroxy aliphatic alcohol containing more than two but less than six carbon atoms and xylol.

6. A composition of matter comprising cellulose ether and butyl alcohol.

Signed at Rochester, New York, this 26th day of January, 1922.

ADRIAAN P. H. TRIVELLI.